United States Patent [19]
Egri

[11] 3,803,004
[45] Apr. 9, 1974

[54] METHOD FOR RECOVERING STEAM-VOLATILE ORGANIC BASES, PARTICULARLY ALKALOIDS OF TOBACCO

[75] Inventor: Laszlo Egri, Basel, Switzerland

[73] Assignee: Tamag Basel AG, Birsfelden, Switzerland

[22] Filed: Mar. 1, 1971

[21] Appl. No.: 119,749

[30] Foreign Application Priority Data
Mar. 4, 1970 Germany............................ 2010185

[52] U.S. Cl....................... 203/29, 203/36, 203/44, 203/96, 23/272.6 S, 131/143, 202/168, 202/234, 260/291
[51] Int. Cl............................ A24b 3/12, B01d 3/38
[58] Field of Search........ 23/272.6 S, 253 R, 230 R; 131/143; 260/291; 203/96, 95, 97, 3, 37, 29, 44; 202/169, 168, 234

[56] References Cited
UNITED STATES PATENTS

| | | | |
|---|---|---|---|
| 3,107,205 | 10/1963 | Moran et al. | 203/42 |
| 3,098,800 | 7/1963 | Moran et al. | 203/42 |
| 3,151,118 | 9/1964 | Moser | 131/143 |
| 3,355,365 | 11/1967 | Butler | 203/3 |
| 3,139,435 | 6/1964 | Staley et al. | 131/143 |
| 1,538,265 | 5/1925 | Arnold | 203/37 |
| 1,577,768 | 3/1926 | Smith | 131/143 |
| 3,436,319 | 4/1969 | Van Horst et al. | 203/96 |
| 3,103,471 | 9/1963 | Asami | 203/42 |

Primary Examiner—Wilbur L. Bascomb, Jr.
Attorney, Agent, or Firm—Woodhams, Blanchard & Flynn

[57] ABSTRACT

Method for analyzing steam-volatile organic bases, particularly alkaloids of tobacco, by means of steam distillation of previously alkalized materials to be tested. Hot steam carrying the steam-volatile bases is introduced directly into a solvent. The organic portion of the steam-volatile bases is dissolved in such solvent while the inorganic portion of such bases is dissolved in an aqueous phase which is formed by the condensing steam. After the distillation is completed the aqueous phase is separated from the organic phase and the organic bases contained in the organic solvent are then quantitatively analyzed.

9 Claims, 1 Drawing Figure

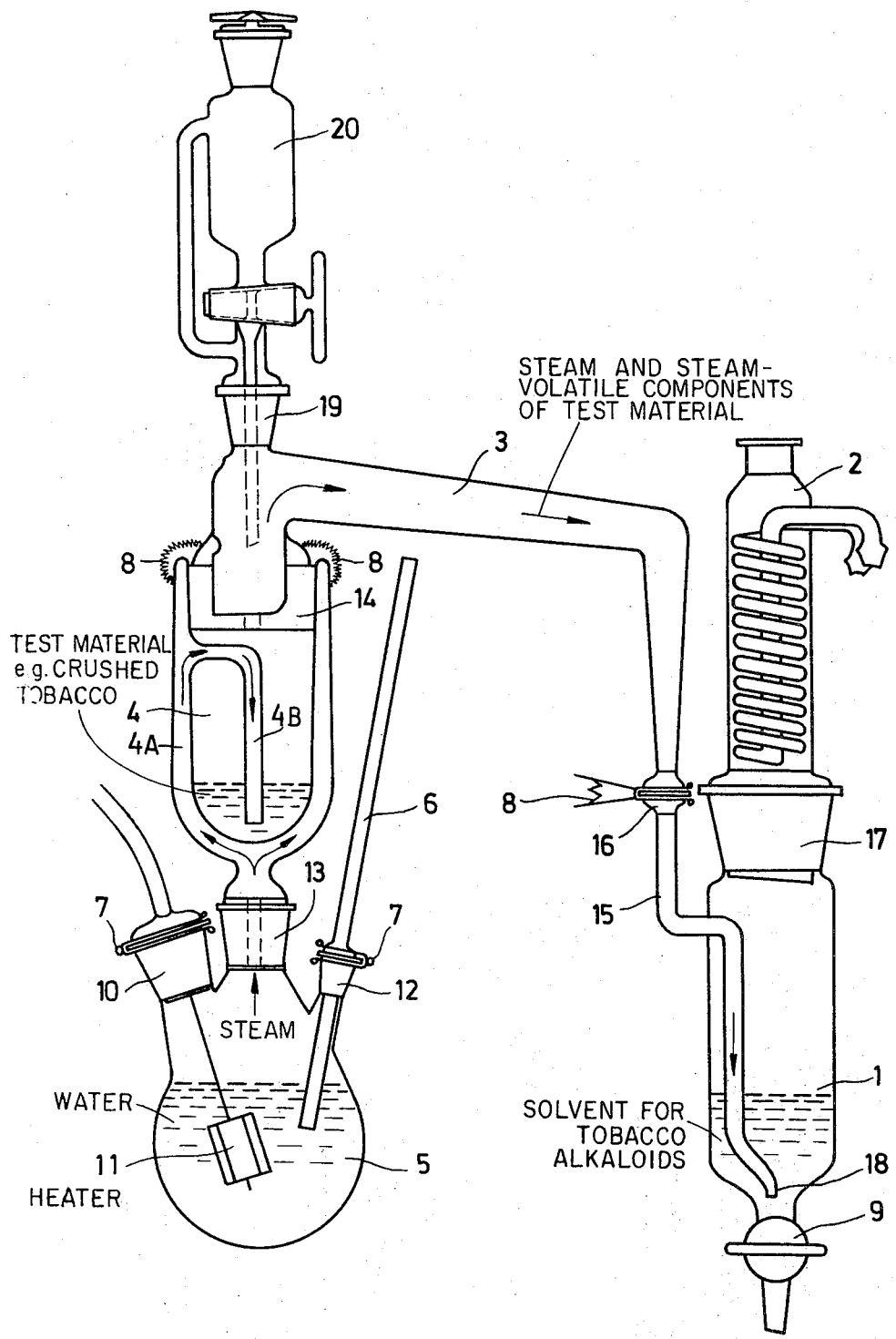

METHOD FOR RECOVERING STEAM-VOLATILE ORGANIC BASES, PARTICULARLY ALKALOIDS OF TOBACCO

The invention relates to a method for analyzing steam-volatile organic bases, particularly alkaloids of tobacco, by means of steam distillation of the alkalized material which is to be tested for its content of steam-volatile organic bases.

In the probably most commonly used present method for analyzing steam-volatile organic bases, particularly plant alkaloids like nicotine, the bases are separated, before the quantitative analysis, from the material being tested by means of alkaline steam distillation after which the alkaloids, for example nicotine, extracted in the distillate and to be analyzed are separated by specific precipitation means, from the accompanying substances and are analyzed gravimetrically or titrimetrically.

This method has the disadvantage that it is time consuming, particularly in view of the separation of the bases to be analyzed and their quantitative analysis and in that trained personnel is required.

More recently, the analysis of the nicotine in the distillate is carried out — after the separation of the interfering accompanying substances — by means of spectrophotometer or colorimeter. However, this variation of the known method does not fully satisfy the needs since although the time required for an analysis is slightly less than in the case of the above-described operation, it is still high and the required apparatus is relatively expensive. Further it requires very precisely adjusted chemicals and "standard" solutions in order to prepare so-called "calibration curves."

Methods are also known in which the organic bases to be analyzed, particularly nicotine from tobacco, are isolated by extraction with organic solvents. Generally higher analysis values are obtained by these methods than in the case of the steam distillation. The reason herefor is that during the extraction not only the volatile organic bases but also other alkaline degradation products and particularly ammonia and alkalizing means are extracted into the organic solvent and adulterate the quantitative analysis. A further disadvantage of the extraction method consists in that after the extraction which as a practical matter must include a shaking operation, the extract or solvent phase must be purified. Furthermore, the emulsion which is formed regularly during the extraction must be destroyed and interfering color components must be removed with the help of special clarification means, for example secondary cellulose acetate filters and absorbent carbon. These operations are time consuming and cause certain losses.

The extraction of nicotine with the help of the alkaline steam distillation does not have the above-described disadvantages, however, it is very complicated and time-consuming in the manner practiced thus far. If the alkaloids are precipitated, filtered and dried after the distilling, then the gravimetric analysis requires so much time that the method, particularly for the continuous manufacture control or for mass analyses, is practically impossible with simple means and without trained personnel.

The basic purpose of the invention is to develop the method of the above-described type that can be performed quickly by means of a simple apparatus and by not particularly well trained personnel. This purpose is attained according to the invention by introducing the hot steam which is loaded with steam-volatile bases directly into a selected solvent in which the organic bases, preferably alkaloids, are dissolved while the inorganic bases are mainly dissolved in an aqueous phase which is formed of condensed steam. Upon completion of the distillation, the aqueous phase is separated from the organic layer, after which the steam-volatile organic bases contained in the organic solvent are quantitatively analyzed.

The method of the invention is a modified steam distillation method in which the steam which contains the volatile organic bases and which is formed during distilling is not, as has been commonly done up to now, condensed by cooling and then further processed, but rather is fed without cooling directly into a given organic solvent which preferably contains so much salt (electrolyte) that, after the distillation is completed, a saturated water phase exists. The increased temperature of the hot distillation steam results in an accelerated extraction of the volatile organic bases into the organic phase. Due to the distillation speed which in the method of the invention is advantageously relatively high, an advantageous intensive mixing of aqueous and organic phases is simultaneously achieved so that the extraction occurs particularly quickly. Furthermore in the method of the invention, as soon as the distillation is completed, the organic and the aqueous layers separate virtually instantaneously and cleanly in the receiving vessel without requiring the operator to use emulsion-breaking means and methods as have been used in the extraction methods applied up to now. The method of the invention is particularly advantageous because the selective separation of the volatile organic bases which are to be analyzed, for example alkaloids, preferably nicotine, from the material to be tested is carried out in one single operation and in the same apparatus. Particularly, in the method of the invention during the distillation, the formed steam volatile bases are continuously separated immediately by extraction into organic base, for example nicotine, and inorganic base, for example ammonia, whereby the nicotine (organic base) distills over quantitatively into the organic phase. Since further, as already mentioned, no emulsion formation occurs between organic and aqueous phases, one can, after the distillation which requires approximately 10 minutes, separate immediately the two phases from one another in a simple manner, for example by discharging the aqueous phase, and can then directly analyze the nicotine in the organic phase, for example potentiometrically or acidimetrically.

By means of the method of the invention, the content of steam-volatile organic bases of crushed plant fibers, particularly crushed tobacco, is readily analyzed. Further, the content of filters, for example cigarette filters and so-called smoke condensations, can also be analyzed according to the method of the invention.

It is particularly advantageous and in most cases even necessary to alkalize the material to be tested by diluting with an alkalinization liquid (electrolyte). As is common an inorganic salt, particularly common salt, can be added in the method of the invention to the mixture of alkalinization liquid and the material to be tested for the accelerated quantitative distillation or separation of the organic steam-volatile bases.

As has been found, the last-mentioned measure is, however, contrary to the known method, not absolutely necessary in the method of the invention and is only advantageous at high ratios of alkalinization liquid to the material to be tested (for example more than approximately 20 ml. 1-percent NaOH for 1 g. of tobacco).

As has been found, for the speed of the nicotine removal in a relatively broad zone of the ratio of vegetable material to alkalinization means and/or liquid, substantially the steam or distillation speed and this quantitative ratio are decisive.

The tests which were made show with respect to this that, if at most 20 ml. liquid are added to 1 g. of tobacco, the nicotine without NaCl-addition can be distilled out from the tobacco just as quickly as if NaCl is added to the tobacco and alkalinization means.

According to a preferred embodiment of the invention, thus, for 1 g. of material to be tested at most 20 ml. alkalinization liquid is used whereby no salt is added to the mixture which is to be distilled.

As has been found, nicotine is removed most rapidly at a steam distillation speed of 10–15 ml./minute, for which reason according to the invention preferably a steam or distillation speed of at least 10ml./minute is used.

According to a preferred embodiment of the invention, the selected organic solvent contains advantageously sufficient salt, preferably common salt that, calculated on the final volume of the distillate (aqueous condensate), a saturated solution is produced.

As has already been mentioned, the invention furthermore relates to an apparatus for performing the above-described method. This apparatus is characterized by a steam distillation apparatus which is connected through a distillation bridge to an extraction tube, at the lowermost point of which there is provided a drain cock and the upper end of which is equipped with a condenser.

Particularly advantageous is an apparatus of the above-identified type in which the distillation bridge opens into a pipe arranged in the extraction tube, the other opening of said pipe being positioned near the lowermost point of the extraction tube.

The end of this pipe opening into the extraction tube is advantageously provided with a gas distributor, for example a glass frit, through which the distillate steam is introduced in a fine and even distribution into the given extraction means.

The opening of the pipe through which the distillate steam is introduced into the extraction tube, is advantageously arranged at such a height relative to the extraction tube that it is positioned, at the end of the distillation, slightly above or at most slightly below the boundary layer between the given extraction solvent and the aqueous condensate accumulating at the bottom of the extraction tube.

In the extraction tube of the above-described inventive apparatus, there takes place, aside for the earlier discussed reasons, a particularly rapid and strong extractive separation of the steam volatile organic bases from the water-soluble components of the distillate steam, particularly inorganic bases, because three extractions take place simultaneously namely two gas-liquid-extractions — between the distillate steam rising in the extraction tube and the selected organic solvent which forms the continuous phase on one side and the aqueous condensate trickling down in disperse phase through the organic solvent on the other side — and a liquid-liquid extraction between the organic solvent and the aqueous condensate whereby all three extraction operations work according to the counterflow principle.

The invention will be discussed in connection with the preferred embodiment of an apparatus for performing the inventive method which embodiment is schematically illustrated in the drawing.

The apparatus has a distilling flask 5 into which an immersion heater 11 is introduced through a ground-in stopper 10 secured with wire clamps 7. A stand-pipe 6 secured with wire clamps 7 is inserted into a further ground-in stopper 12. A distilling attachment 4 of the known type is placed onto the distilling flask 5 by means of a further ground-in stopper 13. A distillation bridge 3, in turn, is placed onto the distilling attachment 4, which bridge is connected to it by a ground-in connection 14 secured with two springs 8. The distillation bridge 3 opens up into a pipe 15 which extends into an extraction tube 1. The distillation bridge 3 and the pipe 15 are connected through a ground-in ball-and-socket joint 16. The extraction tube 1 is at its lowermost point provided with a drain cock 9 and carries a condenser 2 received in a ground-in connection 17. The lower end of the pipe 15 extends well into the extraction tube 1 so that its opening 18 is close to the drain cock 9.

According to a preferred embodiment of the invention, especially for performing a nicotine analysis, the distilling flask 5 is first filled with water to approximately two-thirds of its volume. Thereafter 2 g. of tobacco which have been ground to powder is added together with 15 ml. of a 15 percent soda lye into the distilling attachment 4.

50 ml. of toluene are present in the extraction tube 1 to which approximately 40 g. of sodium chloride is added. Thereafter the individual parts are put together to form the apparatus illustrated in the drawing and the immersion heater is connected to an electrical current source (not illustrated). Steam is generated in the flask 5 by the heater 11. The steam rises in to the distilling attachment 4 wherein it first flows through the annular jacket 4A and thence downwardly through the pipe 4B. The steam then contacts the test material and distills therefrom the steam volatile components thereof. The steam containing the steam volatile components of the test material then flows through the bridge 3 and thence into the extraction tube 1. The distillation can, according to experience, be completed within about 10 minutes during which time approximately 130 to 150 ml. distillate are fed into the extraction tube 1. Upon feeding the hot distillate into the cold toluene mixed with sodium chloride, the nicotine which is carried in the steam is extracted quantitatively by the toluene. As soon as the distillation is completed, the solvent-water-mixture separates readily and the aqueous phase (water with sodium chloride dissolved therein) is discharged through the drain cock. For analyzing the nicotine, the solvent (extract phase) is then taken from the extraction tube and the quantitative analysis is performed according to any known method, for example by acidimetrical titration.

For the determination of the influence of the various operating conditions, on the analysis result, particularly with reference to the combination of the distillation mixture, several series of tests were conducted, the most important characteristics of which are combined in the following Tables I, II and III.

TABLE I

Constant dilution ratio at various soda-lye concentrations

| Test | Distillation Mixture | Distillation Time | Found Nicotine Content |
|---|---|---|---|
| a) | 2 g. tobacco + 20 ml. NaOH 30% | 10 min. | 2.67 / 2.58% |
| b) | 2 g. tobacco + 20 ml. NaOH 15% | 10 min. | 2.86 / 2.79% |
| c) | 2 g. tobacco + 20 ml. NaOH 10% | 10 min | 2.82 / 2.84% |
| d) | 2 g. tobacco + 20 ml. NaOH 5% | 10 min. | 2.75 / 2.78% |
| e) | 2 g. tobacco + 20 ml. NaOH 2% | 10 min. | 2.71 / 2.72% |
| f) | 2 g. tobacco + 20 ml. NaOH 1% | 10 min. | 2.67 / 2.70% |

TABLE II

Variable dilution ratio at a constant NaOH-concentration

| Test | Distillation Mixture | Distillation Time | Found Nicotine Content |
|---|---|---|---|
| a) | 2 g. tobacco + 1% NaOH 20ml. | 10 min. | 2.67 / 2.70 % |
| b) | 2 g. tobacco + 1% NaOH 30ml. | 10 min. | 2.65 / 2.62 % |
| c) | 2 g. tobacco + 1% NaOH 40ml. | 10 min. | 2.59 / 2.60 % |
| d) | 2 g. tobacco + 1% NaOH 50ml. | 10 min. | 2.30 / 2.15 % |
| e) | 2 g. tobacco + 1% NaOH 70ml. | 10 min. | 1.94 / 1.84 % |
| f) | 2 g. tobacco + 1% NaOH 100ml. | 10 min | 1.63 / 1.62 % |

TABLE III

Same conditions as in IIb) and d), however, with addition of NaCl

| Test | Distillation Mixture | Found Nicotine Content |
|---|---|---|
| a) | 2 g. tobacco + 30ml. NaOH 1% + 15g. NaCl | 2.60 % |
| b) | 2 g. tobacco + 50ml. NaOH 1% + 25g. NaCl | 2.71 % |

From the above test results one can see that:
1. in the method of the invention a very highly concentrated lye need not be used as the alkalinization liquid, although such must be used in known methods (in which for example 8 N, namely about a 32 percent soda lye is used in order to quickly achieve a virtually complete removal of the nicotine to be analyzed). Rather according to the invention advantageously about a 2 to 5 percent lye solution is used even when only 1 percent NaOH is used according to the invention a result is achieved which is just as good as with a 30 percent soda lye (compare Table I). 2. the found nicotine content drops clearly if per g. of tobacco, more than approximately 20 ml. of alkalinization liquid are used (compare Table II, tests a to c, on the one hand and d to f, on the other side), and finally 3. the addition of NaCl to the mixture of tobacco and alkalinization liquid to be distilled has no significantly favorable effect on the found nicotine content when less than about 20 ml. of alkalinization liquid per g. of tobacco are used (compare Table II, test b) and Table III, test a)), while if more than about 20 ml. alkalinization liquid is used for each g. of tobacco, by diluting (mixing) the distillation mixture with NaCl, a drop in the nicotine content found during the analysis can be prevented (compare Table II, test d) and Table III, test b)).

If in place of the nicotine content of tobacco, for example the nicotine content of cigarette filters is to be analyzed, then one needs an apparatus of the type illustrated in the drawing in which the distillation bridge 3 is provided with a further ground-in stopper 19 wherein a dropping funnel 20 with a pressure balance is positioned.

The nicotine analysis in this apparatus is performed for example as follows:

10 (cut-open) filters, 20 ml. methanol and 5 ml. $H_2SO_4$ are placed into the distilling attachment 4, after which the dropping funnel 20 is placed thereon and is filled with 10 ml. 30 percent soda lye.

Thereafter one distills in this embodiment of the method of the invention approximately 100 ml. in an acid environment (the extraction tube 1 having not yet been filled with extraction means), discharges the distillate from the extraction tube 1 and discards it.

Then 50 ml. toluene and 50 g. NaCl are placed into the extraction tube after which the soda lye is dropped from the dropping funnel 20 into the distilling attachment 4 and the operation is continued for a distillation time of 10 minutes as in the earlier described analysis of the nicotine content of tobacco.

In order to check the reproducibility of the analysis results which are obtained according to the method of the invention and their consistency with values analyzed according to common methods, an impartial institute was asked to make comparison analyses whereby a good reproducibility of the analysis values determined according to the method of the invention was found and with reference to the consistency with comparison values determined according to the classical nicotine-analyzing methods, for example, the results listed in the following Table IV were obtained.

TABLE IV

Nicotine Content analyzed according to:

| Test No. | the method of the invention | The Spectrophotometer method | The picrate method |
|---|---|---|---|
| 1 | 1.67% | 1.68% | 1.56% |
| 2 | 1.36% | 1.35% | 1.35% |
| 3 | 2.45% | 2.44% | 2.44% |
| 4 | 0.88% | 0.87% | 0.95% |
| 5 | 2.23% | 2.17% | 2.18% |
| 6 | 1.01% | 0.90% | 0.97% |

I claim:

1. A method for treating a test material selected from the group consisting of tobacco, cigarette filters and condensed tobacco smoke, said test material containing steam-volatile components including tobacco alkaloids, to remove essentially all of said tobacco alkaloids therefrom and to obtain a solution of said tobacco alkaloids dissolved in organic solvent, consisting essentially of the steps of:

flowing a stream of steam through said test material to volatilize the steam-volatile components of said test material, including essentially all of said steam-volatile tobacco alkaloids in said test material, to obtain a vapor phase consisting essentially of a mixture of steam and said steam-volatile components;

feeding said vapor phase directly into a liquid phase, water-insoluble, organic, extraction solvent for said steam-volatile tobacco alkaloids, said solvent being contained in a vessel, and obtaining in the vessel a first liquid phase comprising a solution of said steam-volatile tobacco alkaloids in said solvent;

condensing the steam in the vessel and obtaining in the vessel a second liquid phase of water containing dissolved therein the water-soluble steam-volatile components of said test material; and then removing the second liquid phase from the vessel and recovering said first liquid phase from the vessel.

2. A method according to claim 1, in which said test material is powdered tobacco and said steam-volatile tobacco alkaloids are nicotine alkaloids.

3. A method according to claim 2, in which the tobacco is mixed with an aqueous solution of alkalizing agent and the stream of steam is flowed through the mixture of tobacco and aqueous alkalizing agent solution.

4. A method according to claim 3, in which the mixture consists of tobacco and aqueous alkalizing agent solution, said mixture containing not more than 20 ml of aqueous alkalizing agent solution per 1 g of tobacco.

5. A method according to claim 3, in which the mixture also contains an inorganic salt.

6. A method according to claim 3, in which the steam is flowed through the mixture at a rate of at least about 10 ml/minute.

7. A method according to claim 3, in which the extraction solvent contains mixed therein at least one inorganic salt in an amount sufficient to form a substantially saturated solution of said salt in said second liquid phase.

8. A method according to claim 3, in which the stream of steam is flowed through a selected quantity of said mixture for a period of time sufficient to volatilize substantially all of the steam-volatile components of the tobacco and then flow of steam is terminated.

9. A method according to claim 3, in which the extraction solvent is toluene and the aqueous solution of alkalizing agent is an aqueous solution of an alkali metal hydroxide.

* * * * *